March 24, 1925.

J. F. O'CONNOR 1,530,735

FRICTION SHOCK ABSORBING MECHANISM

Filed June 25, 1923    2 Sheets-Sheet 1

Witnesses

Inventor
John F. O'Connor
By George I. Haight
His Atty.

March 24, 1925.

J. F. O'CONNOR 1,530,735

FRICTION SHOCK ABSORBING MECHANISM

Filed June 25, 1923      2 Sheets-Sheet 2

Witnesses
Wm. Geiger

Inventor
John F. O'Connor
By George I. Haight
His Atty.

Patented Mar. 24, 1925.

1,530,735

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed June 25, 1923. Serial No. 647,435.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft rigging, which can be cheaply manufactured, is provided with large friction wearing areas and of high capacity.

A further object of the invention is to provide a shock absorbing mechanism of the type indicated, wherein, during compression, there is an initial action, during which only about one half of the friction surfaces function, thereby producing less resistance than is produced during the latter part of the compression stroke.

A more specific object of the invention is to provide a friction shock absorbing mechanism including a pair of follower casings, a longitudinally extending central friction element, wedges co-acting with said follower casings and friction elements, and a pair of spring resisted, wedge friction elements co-acting with said wedges, wherein the wedge elements have no transverse movement relative to the housings and the parts are automatically held in central position without any destructive cutting of the guides.

Other objects and advantages of the invention will more clearly appear from the description and claims hereinafter following.

Figure 1:
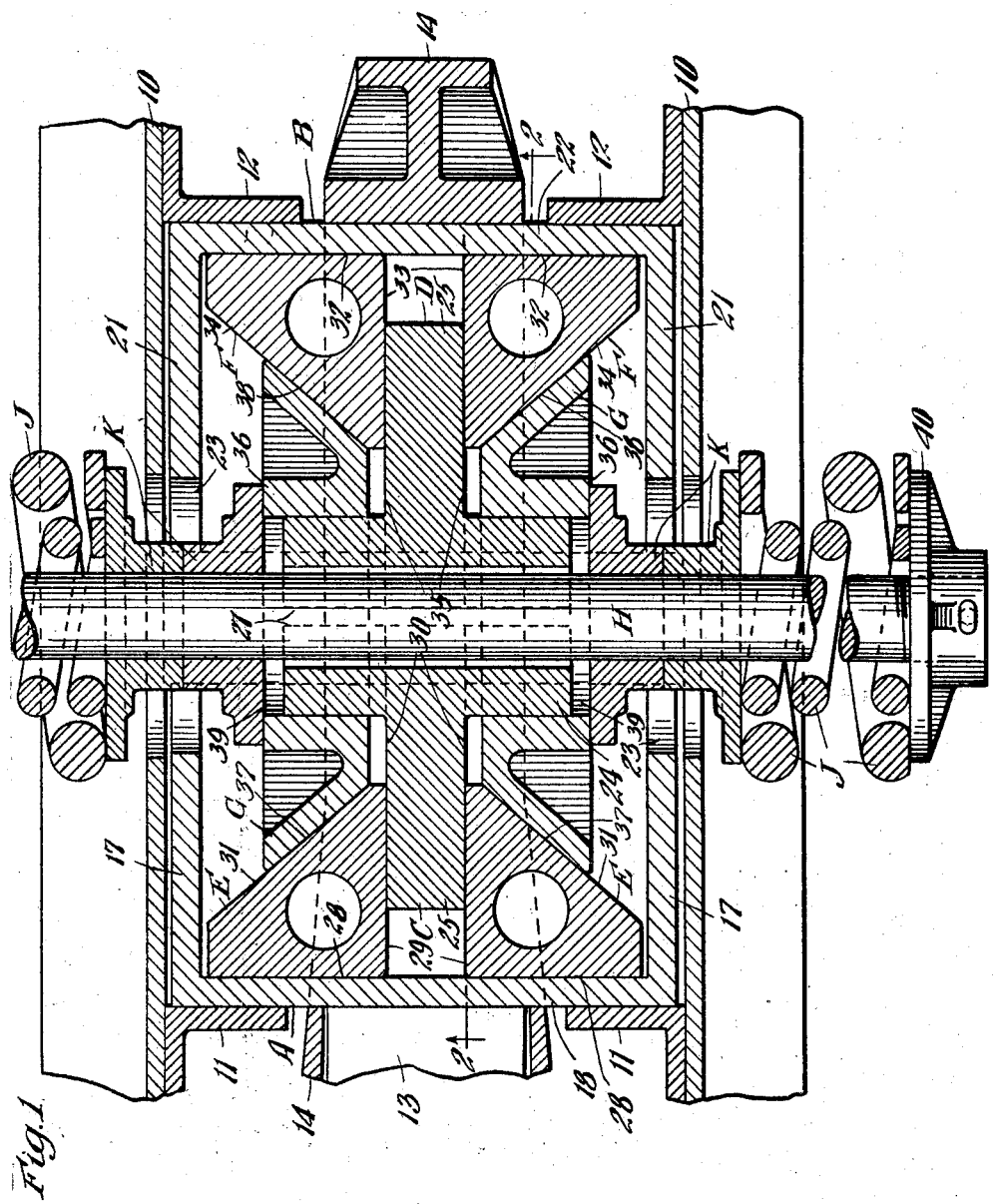
Figure 2:
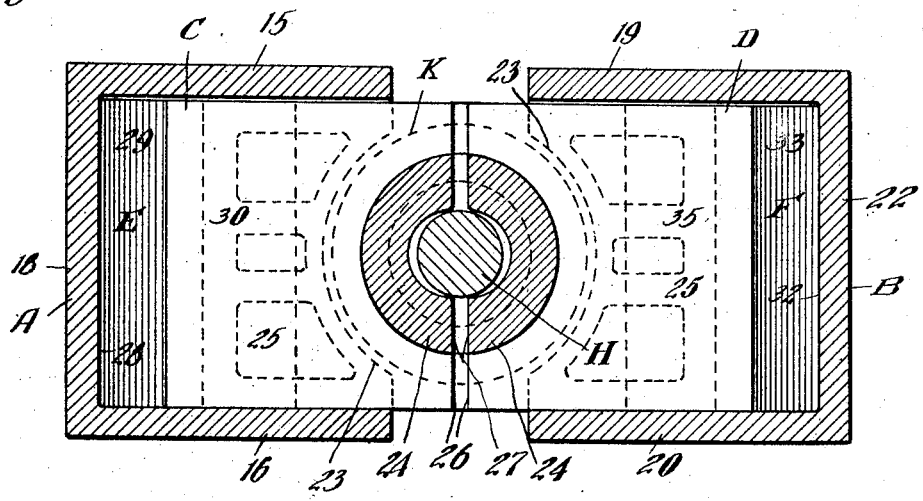
Figure 3:
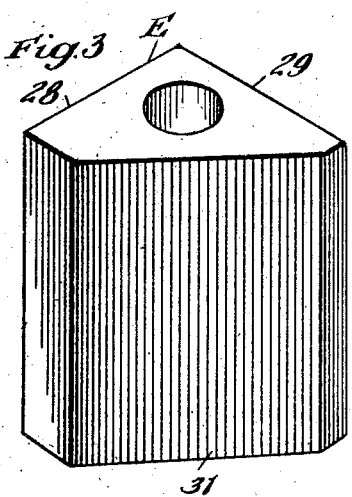
Figure 4:
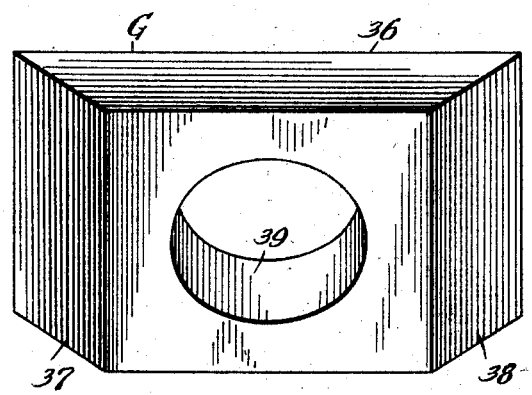

In the drawings forming a part of this specification, Fig. 1 is a horizontal, longitudinal, sectional view of a portion of a railway draft rigging showing my improvements in connection therewith. Fig. 2 is a vertical, longitudinal, sectional view corresponding substantially to the line 2—2 of Fig. 1. Fig. 3 is a detail perspective view of one of the wedge blocks. And Fig. 4 is a detail perspective view of one of the side friction members, In said drawings, 10—10 indicates channel draft sills of a railway car under-frame, to the inner faces of which are secured front stop lugs 11 and rear stop lugs 12. The inner end portion of the drawbar is indicated at 13, to which is attached a hooded cast yoke 14, the shock absorbing mechanism proper being operatively disposed within the yoke.

The shock absorbing mechanism proper comprises, broadly, a front follower casing A; a rear follower casing B; a pair of central friction elements C and D; a pair of front wedge blocks E—E; a pair of rear wedge blocks F—F; a pair of oppositely disposed side friction members G—G; a transversely extending bolt H; a pair of springs J—J, one on the outer side of each draft sill; and a pair of sectional spring followers or spools K—K.

The front and rear follower casings A and B are of like construction, each being a box-like casting. The front follower casing A is provided with spaced top and bottom walls 15 and 16, spaced side walls 17—17, and a transverse front end wall 18. The front wall 18 is adapted to co-act with the front stop lugs 11—11 in a well known manner. The rear follower casing B is provided with spaced top and bottom walls 19 and 20, spaced side walls 21—21, and a transversely extending rear end wall 22 adapted to co-act with the rear stop lugs 12—12. The inner ends of the front and rear followers are spaced apart a proper distance to permit full compression movement of the mechanism, and are adapted to abut and form stops when the gear is fully compressed, the force being then transmitted directly through the followers to the stop lugs on the draft sills. As clearly shown in Fig. 1, the inner ends of the side walls of both followers are recessed as indicated at 23 to provide proper clearance for the spools K when the gear is fully compressed, so that the lateral movement thereof will not be interfered with.

The pair of central friction elements C and D are arranged longitudinally of the gear, the friction member C being disposed forwardly of the center of the gear and the friction element D rearwardly thereof. Each of the friction elements C and D comprises, a hollow semi-cylindrical portion 24 extending laterally of the gear, and a platelike rectangular arm 25 projecting centrally from the portion 24, at right angles to the axis thereof and disposed parallel with the axis of the gear. The inner end 26 of the arm 25 of each element C and D is in alinement with the flat end faces 27 of the semi-cylindrical portion 24 thereof. The elements C and D are normally spaced apart slightly, as shown in Figs. 1 and 2, and are adapted to have slight relative movement longitudinally of the gear, limited by engagement of the inner end 26 and faces 27 of the plate and semi-cylindrical portion respectively, of one of the members with the corresponding portions of the other member.

The wedges E—E associated with the front follower A are arranged on opposite sides of the arm 25 of the element C and are of like construction. Each of the wedges E is provided with a flat front face 28 adapted to abut the inner face of the front wall 18 of the follower A, a flat side face 29 adapted to co-act with the adjacent flat face 30 of the arm 25 of the element C, and a wedge face 31 adapted to co-act with one of the friction members G.

The wedges F associated with the rear follower B are similarly arranged to the wedges E, and each is provided with a flat end face 32, a flat inner side face 33, and a wedge face 34. The face 32 is adapted to abut the rear wall 22 of the follower B and the face 33 is adapted to co-act with one of the flat side faces 35 of the arm 25 of the friction element D The wedge friction members G—G are of like construction and are disposed at opposite sides of the gear. Each of the members G is provided with an outer flat face 36, and a pair of wedge faces 37 and 38, the wedge face 37 being located at the front end thereof and adapted to co-act with the wedge face 31 of one of the wedges E and the wedge face 38 being located at the rear end thereof and adapted to co-act with the wedge face 34 of a wedge F. Each of the members G is also provided with a cylindrical, transversely extending recess 39 adapted to receive the semi-cylindrical portions 24 located at one side of the arms 25 of the members C and D. As clearly shown in Fig. 1, the recesses 39 are in axial alinement and the walls thereon are adapted to limit the outward movement of the friction elements C and D by engagement with the semi-cylindrical portions thereof, and hold the same in proper alinement.

Relative separating movement of the friction members G is opposed by the spring resistance elements J. The spring resistance elements J are located at opposite sides of the mechanism, each of said spring resistance elements being interposed between a collar 40 fixed at the end of the bolt H and a sectional spring follower or spool K bearing on the flat outer face 36 of the adjacent side friction member G. In this connection, it will be noted that in the normal full release position of the parts, a space is left between the inner ends of the spools K and the opposite ends of the semi-cylindrical portions of the central friction elements C and D to compensate for wear of the friction and wedge faces of the mechanism. In Fig. 1 of the drawings, only one of the collars 40 is shown, the bolt H being broken away at the upper end of this figure to accommodate the view to the sheet of the drawing. The bolt H passes axially through the alined recesses 39 of the side friction members G and between the curved inner faces of the hollow semi-cylindrical portions 24 of the central friction elements C and D. The front and rear sides of the bolt H are adapted to abut with the inner walls of the semi-cylindrical portions 24 when the inner ends of the members C and D are brought into abutment thereby arresting relative inward movement of the elements C and D.

The operation of the mechanism is as follows, assuming a buffing movement of the drawbar. The wedges E will be moved inwardly toward the read wedges F forcing the side members G—G apart by engagement with the wedge faces thereof. During the initial movement of the wedges due to the friction created between the faces 29 of the wedges E and the side faces of the arm 25 of the central friction element D, the latter will be moved bodily with the wedges until movement of the same is limited by engagement with the front end of the rear friction element D, whereupon the wedges E will slide relatively to the friction elements C and the friction element D will be moved rearwardly relative to the wedges F, the side faces thereof sliding on the flat faces 33 of the wedges. The described movement will continue until the inner ends of the followers A and B are brought into abutment, whereupon the pressure will be transmitted directly through the front and rear followers A and B to the rear stop lugs 12. In this connection it will be noted that a preliminary action is had during the time that the friction element C is being moved bodily with the wedges and rear friction element D remains stationary, each pair of wedges E and F at that time acting as a single wedge having an effective wedging angle of 100°. During the remainder of the compression stroke while the wedges and central elements have a relative sliding movement, the wedges composing each pair act separately and with the same effective wedging angle of 100°. During draft, the action is similar to that just described, the only difference being that the movement of the parts is reversed, the rear follower B being moved toward the front follower A which is held stationary.

During the release the friction elements C and D will first be moved apart relatively, held by the respective adjacent wedges E—E and F—F, thus effecting an easy initial release action, thereby breaking the frictional resistance of the parts and increasing the release capacity. This initial action terminates when the relative movement of the friction elements C and D is arrested by abutment of the body portions thereof with the walls of the recesses 39 of the friction members G, whereupon the wedges will slide outwardly on the friction elements C and D and all of the parts be restored to normal position by the action of the springs.

From the preceding description it will be evident that I have provided a gear having exceptionally large frictional areas; in which the parts are automatically held in centered position; wherein there is no appreciable wear on the housings in that the wedge blocks which engage the housings have no transverse movement thereon; wherein the shock absorbing mechanism has a preliminary action in compression during which the only friction created is between the wedges and the side friction members, the frictional resistance being augmented during the remainder of the compression stroke of the mechanism by the sliding movement of the wedges on the friction faces of the central friction elements, and in which a preliminary action is had during release by the reverse movement of the parts, breaking the frictional resistance and increasing the release capacity of the mechanism.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with end followers movable relatively toward each other; of end wedges movable with the respective followers; a pair of relatively movable central friction elements having means associated therewith for limiting their relative movement prior to full compression of the mechanism, said elements and wedges having co-operating friction surfaces extending parallel to the axis of the shock absorbing mechanism; additional friction members on each side of said central friction elements and having frictional engagement with said wedges, said friction members being relatively separable; and spring means for resisting separating movement of said side friction members.

2. In a friction shock absorbing mechanism, the combination with end followers movable relatively toward each other; of end wedges movable with the respective followers; a pair of alined, front and rear longitudinally arranged, central friction elements having their inner ends normally spaced apart to provide for limited relative movement, said elements and wedges having co-operating friction surfaces extending parallel to the axis of the mechanism; additional friction members on each side of the central friction elements and having frictional engagement with wedge faces of said wedges, said friction members being relatively separable; and spring resistance elements opposing the relative separating movement of said side friction members.

3. In a friction shock absorbing mechanism, the combination with end followers movable relatively toward each other; of end wedges movable with the respective followers; a pair of alined, longitudinally arranged, central friction elements having limited relative movement, said elements and wedges having co-operating friction surfaces; additional friction members on each side of said central friction elements and having frictional engagement with the wedge faces of said wedges, said friction members having means thereon for limiting the relative movement of the central friction elements, and being relatively separable; and resilient means resisting the separating movement of said side friction members.

4. In a friction shock absorbing mechanism, the combination with end followers movable relatively toward each other; of end wedges movable with the respective followers; a pair of longitudinally arranged, relatively movable, central friction elements, normally having their inner ends slightly spaced apart, and adapted to have the inward movement thereof limited by abutment of said inner ends, said elements and wedges having co-operating friction surfaces extending parallel to the axis of the mechanism; additional friction members on each side of said central friction elements and having frictional engagement with the wedges, said friction members being relatively separable; and spring resistance elements opposing relative separation of said friction members.

5. In a friction shock absorbing mechanism, the combination with front and rear followers movable relatively toward each other; of a pair of wedges movable with the front follower; a pair of wedges movable with the rear follower; front and rear, central friction elements, said elements being longitudinally disposed in axial alinement, and said front and rear friction elements and front and rear wedge elements having co-operating friction surfaces extending substantially parallel to the axis of the mechanism, additional friction members on each side of said central friction elements having frictional engagement with said front and rear wedges, said friction members being relatively separable; and spring means resisting separation of said members.

6. In a friction shock absorbing mechanism, the combination with end followers relatively movable toward each other; of end wedges movable with the respective followers; a plurality of relatively movable, central friction elements, each comprising a longitudinally extending arm and lateral abutments, said arms and wedges having co-operating friction surfaces; side friction members having friction surfaces co-operating with the wedges, and abutment faces co-acting with said lateral abutments for limiting outward movement of said elements, said friction members being relatively separable; and spring means resisting the separating movement of said members.

7. In a friction shock absorbing mechanism, the combination with front and rear followers, relatively movable toward each other; of end wedges movable with the respective followers; front and rear, central friction elements having limited relative longitudinal movement, each of said elements comprising a body portion and a central arm extending laterally from said body portion, the arm of said front element projecting forwardly and the arm of said rear element projecting rearwardly, said arms and wedges being provided with co-operating surfaces extending longitudinally of the mechanism; side friction members having friction faces co-acting with the wedge faces of said wedges and being provided with alined recesses adapted to receive the body portions of said central elements, the walls of said recesses forming stops to limit the outward movement of said central elements by engagement with said body portions, said side friction members being relatively separable; and spring means for resisting separating movement of said side members.

8. In a friction shock absorbing mechanism, the combination with front and rear followers, relatively movable toward each other; of end wedges movable with the respective followers; front and rear, relatively movable, central friction elements, said elements being adapted to abut to limit their relative movement toward each other, each of said elements comprising a body portion and a central arm extending laterally from said body portion, the arm of said front element projecting forwardly and the arm of said rear element projecting rearwardly, said arms and wedges being provided with co-operating friction surfaces extending longitudinally of the mechanism; side friction members having friction faces co-acting with the wedges and provided with alined recesses adapted to receive the body portions of said central elements, said side friction members being relatively separable; and spring resistance means for opposing separating movement of said members.

In witness that I claim the foregoing I have hereunto subscribed my name this 16th day of June, 1923.

JOHN F. O'CONNOR.

Witnesses:
FRANCES SAVAGE,
HARRIETTE M. DEAMER.